(12) United States Patent
De Vos et al.

(10) Patent No.: US 11,770,018 B2
(45) Date of Patent: Sep. 26, 2023

(54) METHOD AND DEVICE FOR CHARGING A STORAGE DEVICE WITH ENERGY FROM AN ENERGY HARVESTER

(71) Applicant: E-PEAS, S.A., Mont-Saint-Guibert (BE)

(72) Inventors: Julien De Vos, Mont-Saint-Guibert (BE); Geoffroy Gosset, Mont-Saint-Guibert (BE); Cedric Hocquet, Mont-Saint-Guibert (BE); Francois Stas, Mont-Saint-Guibert (BE)

(73) Assignee: E-PEAS S.A., Mont-Saint-Guibert (BE)

( * ) Notice: Subject to any disclaimer, the term of this patent is extended or adjusted under 35 U.S.C. 154(b) by 398 days.

(21) Appl. No.: 17/040,563

(22) PCT Filed: Mar. 1, 2019

(86) PCT No.: PCT/EP2019/055172
§ 371 (c)(1),
(2) Date: Sep. 23, 2020

(87) PCT Pub. No.: WO2019/179752
PCT Pub. Date: Sep. 26, 2019

(65) Prior Publication Data
US 2021/0075248 A1    Mar. 11, 2021

(30) Foreign Application Priority Data
Mar. 23, 2018 (EP) .................................... 18163784

(51) Int. Cl.
*H02J 7/34* (2006.01)
*H02M 1/36* (2007.01)
*H02J 50/00* (2016.01)

(52) U.S. Cl.
CPC .............. *H02J 7/345* (2013.01); *H02M 1/36* (2013.01); *H02J 50/001* (2020.01); *H02J 2207/20* (2020.01); *H02J 2207/50* (2020.01)

(58) Field of Classification Search
CPC ...... H02J 7/345; H02J 50/001; H02J 2207/20; H02J 2207/50; H02M 1/0045; H02M 1/36
See application file for complete search history.

(56) References Cited

U.S. PATENT DOCUMENTS

2009/0079385 A1*  3/2009  Xiao ....................... H02M 3/07
                                                          320/102
2014/0233270 A1    8/2014  Desai et al.
(Continued)

FOREIGN PATENT DOCUMENTS

WO      2017117247 A1    7/2017

OTHER PUBLICATIONS

Int'l. Search Report for PCT/EP2019/055172, dated Apr. 30, 2019.

*Primary Examiner* — Richard Isla
*Assistant Examiner* — Johali A Torres Ruiz
(74) *Attorney, Agent, or Firm* — MaxGoLaw PLLC

(57) ABSTRACT

A method for charging a storage device, such as a capacitor or a supercapacitor, with energy from an energy harvester and using a voltage converter having a coldstart voltage convertor and a main voltage converter is provided. After charging a buffer capacitor with the coldstart voltage converter up to the first voltage V1, the method repetitively performs steps of a) charging the buffer capacitor with the main voltage converter up to a voltage V2>V1, followed by transferring charges from the buffer capacitor to the storage device, b) stopping transferring charges to the storage device when the voltage of the buffer capacitor is below a third voltage value V3, with V1<V3<V2. The steps a) to b) are repeated until the storage device has reached a storage (Continued)

Figure 1:
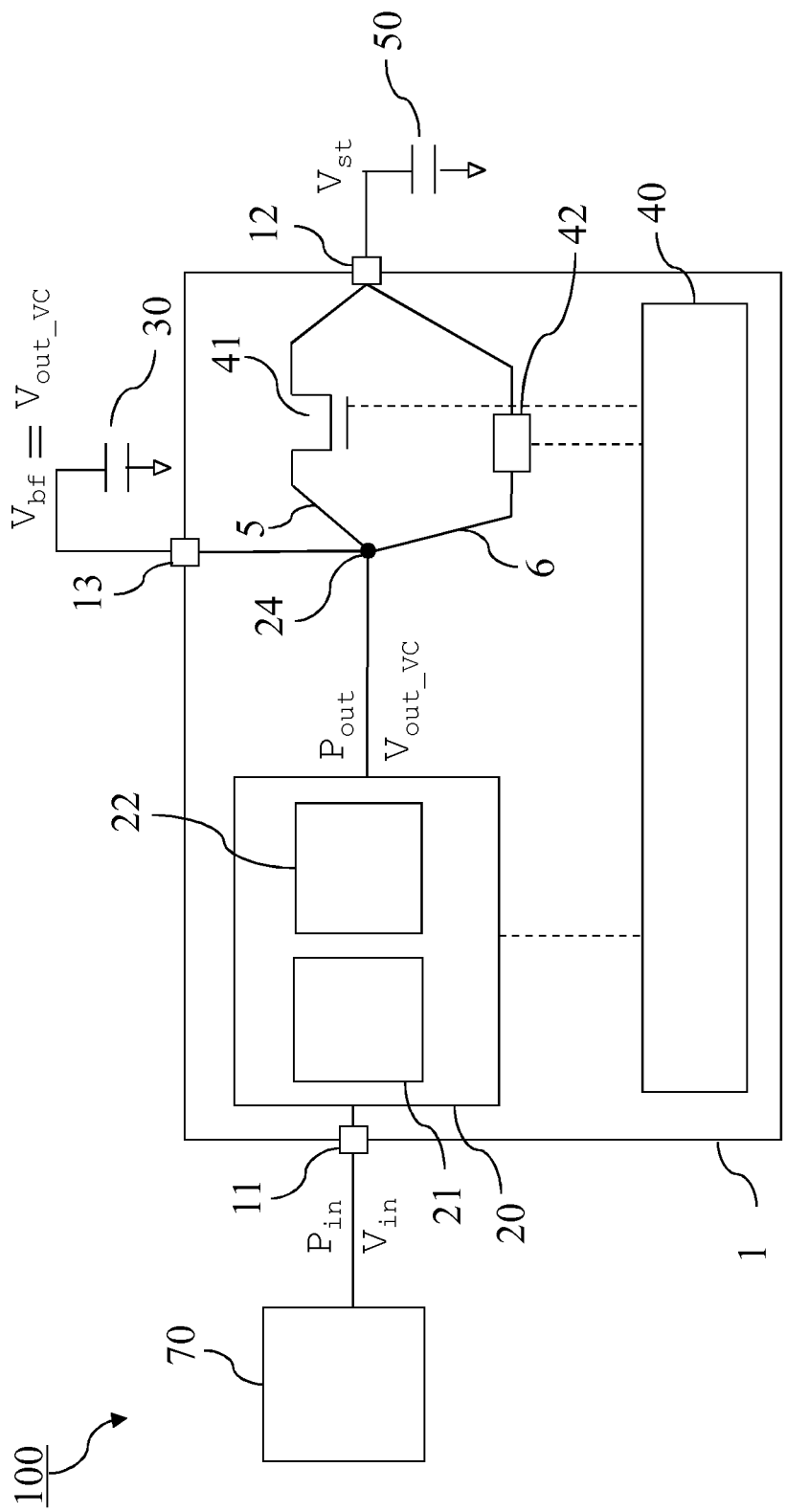

reference voltage value Vst-ref with $V1<Vst\text{-}ref<V3$. A power management integrated circuit for charging a storage device according to the method is provided.

9 Claims, 5 Drawing Sheets

(56) References Cited

U.S. PATENT DOCUMENTS

| | | | |
|---|---|---|---|
| 2015/0249362 A1* | 9/2015 | Bridgelall | B64C 1/00 320/137 |
| 2015/0256015 A1 | 9/2015 | Gudan et al. | |
| 2016/0105098 A1* | 4/2016 | Savulak | H02J 1/12 323/234 |

* cited by examiner

METHOD AND DEVICE FOR CHARGING A STORAGE DEVICE WITH ENERGY FROM AN ENERGY HARVESTER

FIELD OF THE INVENTION

The present invention relates to a method for charging a storage device with energy from an energy harvester using a voltage converter. More specifically it relates to a method for charging a storage device with a voltage converter comprising a main voltage converter and a cold start voltage converter.

The invention also relates to a power management integrated circuit (PMIC) for energy harvesting.

DESCRIPTION OF PRIOR ART

A PMIC for energy harvesting is a microchip that is designed to acquire and manage the microwatts to milliwatts of power generated by an energy harvester. These PMIC's for energy harvesting are known in the art and typically comprise an input terminal for making a connection with the energy harvester so as to receive an input power. The PMIC comprises a voltage converter that receives the input power from the energy harvester and converts the input power in an output power that is transferred to one or more output terminals.

An energy storage device is generally connected to one of the output terminals of the PMIC. The storage device stores the energy harvested from the energy harvester.

Examples of storage devices are Li-ion battery, a thin film battery or a super or a conventional capacitor.

Examples of energy harvesters are photovoltaic cells (PV), thermoelectric generators (TEG) and electromagnetic energy sources.

A PMIC is for example available from the applicant of the current patent application and known under the reference number AEM10940. The voltage converter of this PMIC comprises a main voltage converter and a cold start voltage converter.

The main voltage converter is operable when an output voltage $V_{out\_VC}$ of the voltage converter is equal or higher than a voltage value V1. As the output of the voltage converter is conductively connected with the output terminal of the storage device for transferring the harvested energy, the output voltage $V_{out\_VC}$ of the voltage converter generally corresponds to a voltage $V_{sto}$ of the storage device. This output voltage is used as a supply voltage for powering the main voltage converter. Typically, for operating the main voltage converter a supply voltage of for example 1.5 V or more is needed. This operating voltage is needed for controlling electronic switches of the main voltage converter.

The main voltage converter is for example a high-efficient DC-DC boost converter for increasing the input voltage $V_{in}$, or a buck converter for decreasing the input voltage, or a buck-boost converter for both decreasing or increasing the input voltage.

For powering the main voltage converter, power from the rechargeable battery can be supplied. However, when the storage device has no energy or a too low energy level, i.e. when the voltage $V_{sto}$ is below the minimum voltage V1, the main voltage converter cannot be operated.

It is the cold-start voltage converter that allows to start acquiring energy from the energy harvester without the use of the main voltage converter until the storage device, conductively connected to the output of the voltage converter, is at least charged up to a voltage equal or larger than V1.

Typically, the cold-start voltage converters, known in the art, comprise a charge pump and are configured to be self-starting, i.e. they start operating automatically when receiving a low input power from the energy harvester. The PMIC with reference AEM10940 comprises for example a cold-start voltage converter that starts to operate at an input voltage $V_{in}$ as low as 380 mV and with an input power of 11 microwatt. The efficiency for extracting energy with a cold-start voltage converter is however very low in comparison with the efficiency for extracting energy with a main voltage converter.

One of the problems with PMIC's comprising a cold-start voltage converter is that when the storage device is fully depleted, it can take a long time to charge the storage device until a voltage level V1 is reached to start operating the main voltage converter and hence start energy harvesting in an efficient way. Especially when the storage device is a capacitor or a supercapacitor, which have no voltage when depleted, the initial charging time with the coldstart voltage converter can become very long.

SUMMARY OF THE INVENTION

It is an object of the present invention to provide a method for charging a storage device with energy from an energy harvester using a voltage converter. More specifically, the method provides a solution for a fast start-up when the storage device is depleted. The method is applicable independently of the type of storage device, the method is for example applicable when the storage device is a capacitor, a supercapacitor or a conventional rechargeable battery. It is a further object of the invention to provide a power management integrated circuit (PMIC) operable for using the fast method for charging any type of storage device, including a capacitor or a supercapacitor. At the same time, it is also an object to provide a PMIC wherein the silicon surface area is minimized and power consumption limited.

The present invention is defined in the appended independent claims. Preferred embodiments are defined in the dependent claims.

According to a first aspect of the invention, a method for charging a storage device with energy from an energy harvester using a voltage converter is provided, and wherein the voltage converter comprises a main voltage converter and a coldstart voltage converter.

The main voltage converter is configured to be operable if the output voltage $V_{out\_VC}$ of the voltage converter is equal or larger than a first voltage value V1.

The method uses a buffer capacitor that is conductively coupled with an output of the voltage converter such that a voltage $V_{bf}$ at the buffer capacitor corresponds to the output voltage $V_{out\_VC}$ of the voltage converter. To reach the first voltage value V1, a coldstart voltage converter is operable for charging the buffer capacitor to this first voltage value V1, using energy from the energy harvester.

When the buffer capacitor has reached the first voltage value V1, the operation of the coldstart is disabled and the operation of the main voltage converter is enabled. The buffer capacitor is further charged until a second voltage value V2 is reached. Thereafter, the buffer capacitor is de-charged by transferring charges from the buffer capacitor to the storage device, thereby charging the storage device.

Advantageously, by stopping the transfer of charges when a third voltage value V3 is reached, with V1<V3<V2, the required operational voltage V1 for operating the main voltage converter remains available and hence there is no further need to use the coldstart voltage converter.

Advantageously, the coldstart voltage converter, having a low efficiency, is only used during a first initial charging period T1 for charging the buffer capacitor to a first voltage value V1. After the initial charging period T1, the buffer capacitor can be cyclically recharged with the main voltage converter without the need of using the cold start voltage converter. The cycle of charging the buffer capacitor to a second voltage value V2 and de-charging the buffer capacitor by transferring charges from the buffer capacitor to the storage device is repeated as long as a monitored parameter $M_{sto}$, indicative of a voltage of the storage device, is lower than a reference value $M_{sto\text{-}min}$. In this way, with the charging and de-charging process of the buffer capacitor, the storage device is step-wise pre-charged during a period T2 until the parameter $M_{sto}$ has reached the reference value $M_{sto\text{-}min}$. This reference value $M_{sto\text{-}min}$ is indicative of a reference voltage value $V_{st\text{-}ref}$ and is comprised in a range $V1 < V_{st\text{-}ref} < V3$.

According to the method of invention, when the parameter $M_{sto}$ has reached the reference value $M_{sto\text{-}min}$, the storage device is conductively connected to the output of the voltage converter and the nominal charging of the storage device is initiated. Indeed, following the connection between the output of the voltage converter and the storage device, the storage device continues to be charged by the power from the energy harvester that is directly being transferred by the main voltage converter to the storage device.

Advantageously, with the method according to the invention, during the pre-charging process, the output voltage $V_{out\_VC}$ of the voltage converter remains equal or higher than V1, which is a similar voltage value as when operating the voltage converter during the nominal charging process. This allows the use of standard voltage converter technology known in the art.

According to a second aspect of the invention, a power management integrated circuit (PMIC) for charging a storage device with an energy harvester is provided.

Such a PMIC comprises an input terminal for receiving an input power $P_{in}$ from an energy harvester and a voltage converter configured for converting the input power $P_{in}$ into an output power $P_{out}$.

The voltage converter according to the invention comprises a main voltage converter and a coldstart voltage convertor. As known in the art, and mentioned above, the main voltage converter is operable if an output voltage $V_{out\_VC}$ at an output node of the voltage converter is equal or larger than a first voltage value V1, while the coldstart voltage convertor is operable if the output voltage $V_{out\_VC}$ is lower than the first voltage value V1.

The PMIC further comprises a first input/output terminal connectable with a storage device and a second input/output terminal connectable with a buffer capacitor. A first conductive path, comprising a switching device, is conductively coupling the output node 24 of the voltage converter with the first input/output terminal. The switching device is configured for opening or closing the first conductive path. The output node 24 of the voltage converter is further conductively coupled with the second input/output terminal.

The coldstart voltage converter when being operable is configured for transferring charges from the input terminal to the second input/output terminal until the voltage $V_{out\_VC}$ has reached the voltage value V1. A controller of the PMIC is configured for disabling operation of the coldstart voltage converter and for enabling operation of the main voltage converter if the output voltage $V_{out\_VC}$ has reached the voltage value V1.

The PMIC according to the invention is characterized in that it comprises a second conductive path that is conductively coupling the output node 24 of the voltage converter with the first input/output terminal. The second conductive path comprises a current control device controlled by the controller and configured for opening or closing the second conductive path and configured for limiting a current flow through the second conductive path when the second conductive path is closed.

Advantageously, the PMIC according to the invention comprises two conductive paths for conductively coupling the output node with the first input/output terminal. In this way, when a storage device is coupled to the first input/output terminal, two different paths can be followed during the charging process of the storage device. By limiting the current flow in the second conductive path with the current control device, the charging process of the storage device can be controlled as discussed above during a pre-charging period until the voltage in the storage device is sufficiently high.

The controller of the PMIC is configured for monitoring the voltage $V_{out\_VC}$ at the output node of the voltage converter and for monitoring the parameter $M_{sto}$, as discussed above, that is indicative of a voltage $V_{st}$ at the first input/output terminal.

Remark that when a storage device and a buffer capacitor are connected to their respective terminals of the PMIC, the voltage of the storage device and the voltage of the buffer capacitor correspond to respectively the voltage $V_{sto}$ at the first input/output terminal and the voltage $V_{out\_VC}$ at the second input/output terminal.

If $M_{sto}$ is lower than a reference value $M_{sto\text{-}min}$ then the controller is maintaining the first conductive path open and the following steps are repetitively performed by the controller:

a) controlling a charge transfer from the input terminal to the second input/output terminal by monitoring an increase of the voltage $V_{out\_VC}$ and if $V_{out\_VC}$ reaches a second voltage value V2, with V2>V1, then closing the second conductive path, and b) controlling a charge transfer from the second input/output terminal to the first input/output terminal by monitoring a decrease of the voltage $V_{out\_VC}$ and if $V_{out\_VC}$ reaches a third voltage value V3, with V1<V3<V2, then opening the second conductive path.

If $M_{sto}$ is equal or larger than the reference value $M_{sto\text{-}min}$, then the controller is closing the first conductive path. In embodiments, when the first conductive path is closed when $M_{sto}$ becomes equal or larger than the reference value $M_{sto\text{-}min}$, then the second conducting path remains closed. In other embodiments, when the first conductive path is closed when $M_{sto}$ becomes equal or larger than the reference value $M_{sto\text{-}min}$, then the second conductive path is opened. As discussed above, the reference value $M_{sto\text{-}min}$ is indicative of a reference voltage value $V_{st\text{-}ref}$ of the storage device, with $V1 < V_{st\text{-}ref} < V3$.

Advantageously, during the pre-charging period following the second conductive path, there is no direct energy transfer from the energy harvester to the storage device, but there is only an indirect and controlled power transfer by using the current control device. Only when the voltage in the storage device is sufficiently high, i.e. when $V_{st} \geq V_{st\text{-}ref}$, will the first conductive path be closed for direct energy harvesting from the energy harvester.

In operation, the current in the second conductive path is limited to a maximum value and the silicon area of the current control device can be kept much smaller than the silicon area of the switching device. In other words, a resistance R2 of the current control device is larger than a resistance R1 of the switching device. In this way, the current control device in the second path that is required for pre-charging the storage device up to a minimum voltage value, is only taking up a limited silicon area of the PMIC. In energy harvesting applications, silicon area and power aspects are crucial because the PMIC must be small in order to be cost effective and to propose an alternative to a standard battery and the PMIC must be power efficient and have a low quiescent current to allow the system to operate with a small energy harvester or to be able to operate when the available ambient energy is low.

Advantageously, with the PMIC according to the invention, when a variable load is coupled with for example the second input/output terminal or with an additional load output terminal, charges only have to flow through one large power switch, i.e. the switch of the switching device. In this way, power losses in the PMIC during nominal operation are limited.

The invention is also related to a system for energy harvesting comprising a PMIC as disclosed above and in the appended claims. The system comprises an energy harvester coupled to a power input terminal of the PMIC, a storage device connected to the first input/output terminal and a buffer capacitor connected to the second input/output terminal.

The use of the term "controller" in the current patent has to be construed in the broadest sense as being an electronic digital circuit generally comprising combinatory logic. The controller is used for controlling various components of the PMIC such as for example the voltage converter, the switching device and the current control device.

SHORT DESCRIPTION OF THE DRAWINGS

Figure 2:
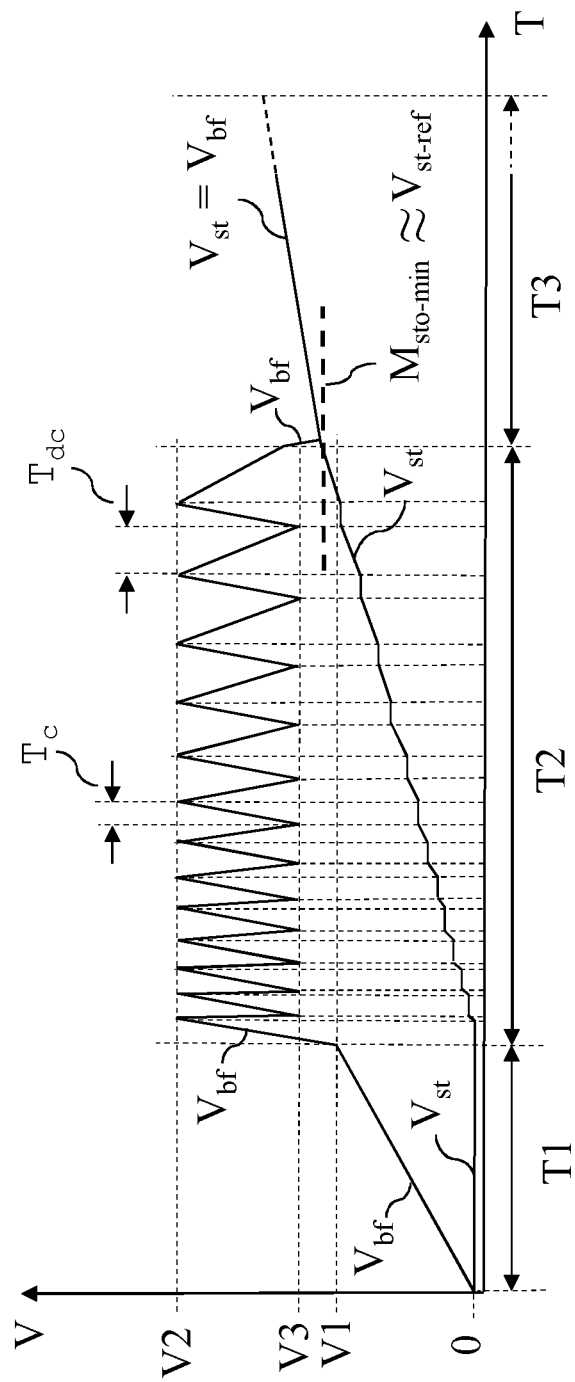

These and further aspects of the invention will be explained in greater detail by way of example and with reference to the accompanying drawings in which:

FIG. 1 shows an example of a system for energy harvesting according to the invention, FIG. 2 shows a voltage of a buffer capacitor and a voltage of a storage device as function of time.

Figure 3:
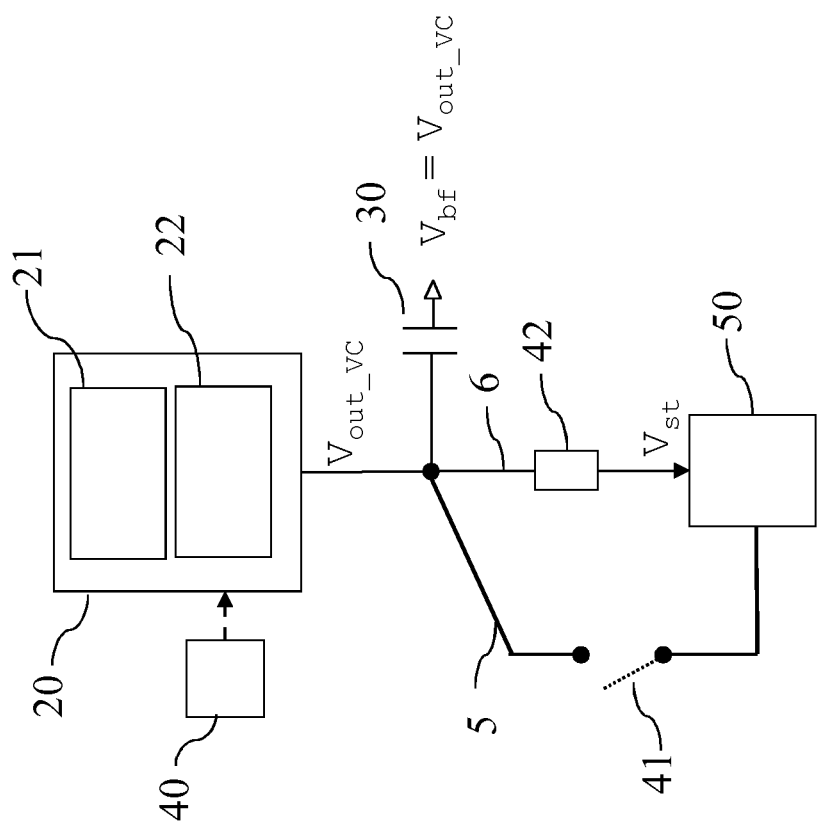
Figure 4:
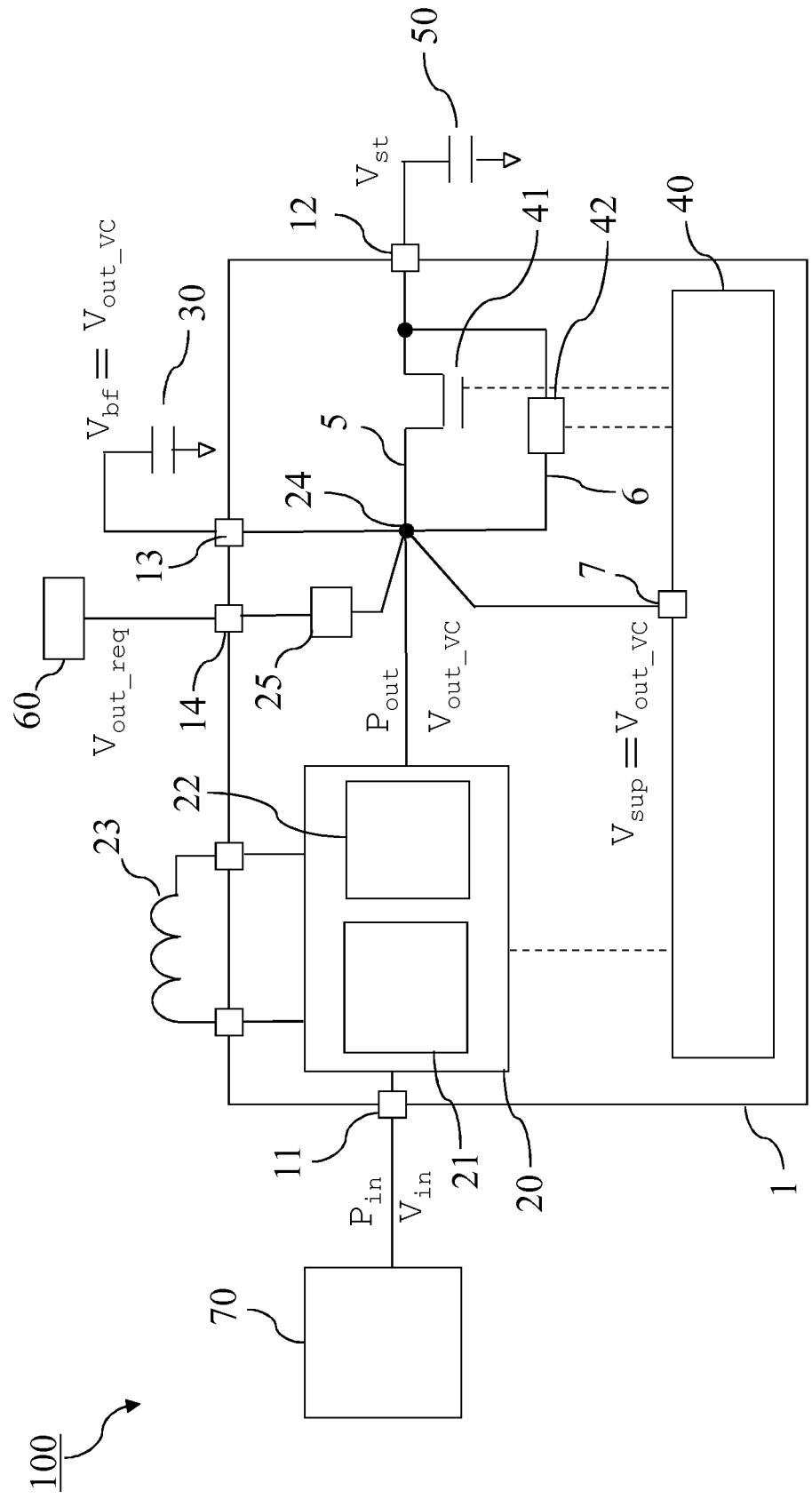
Figure 5:
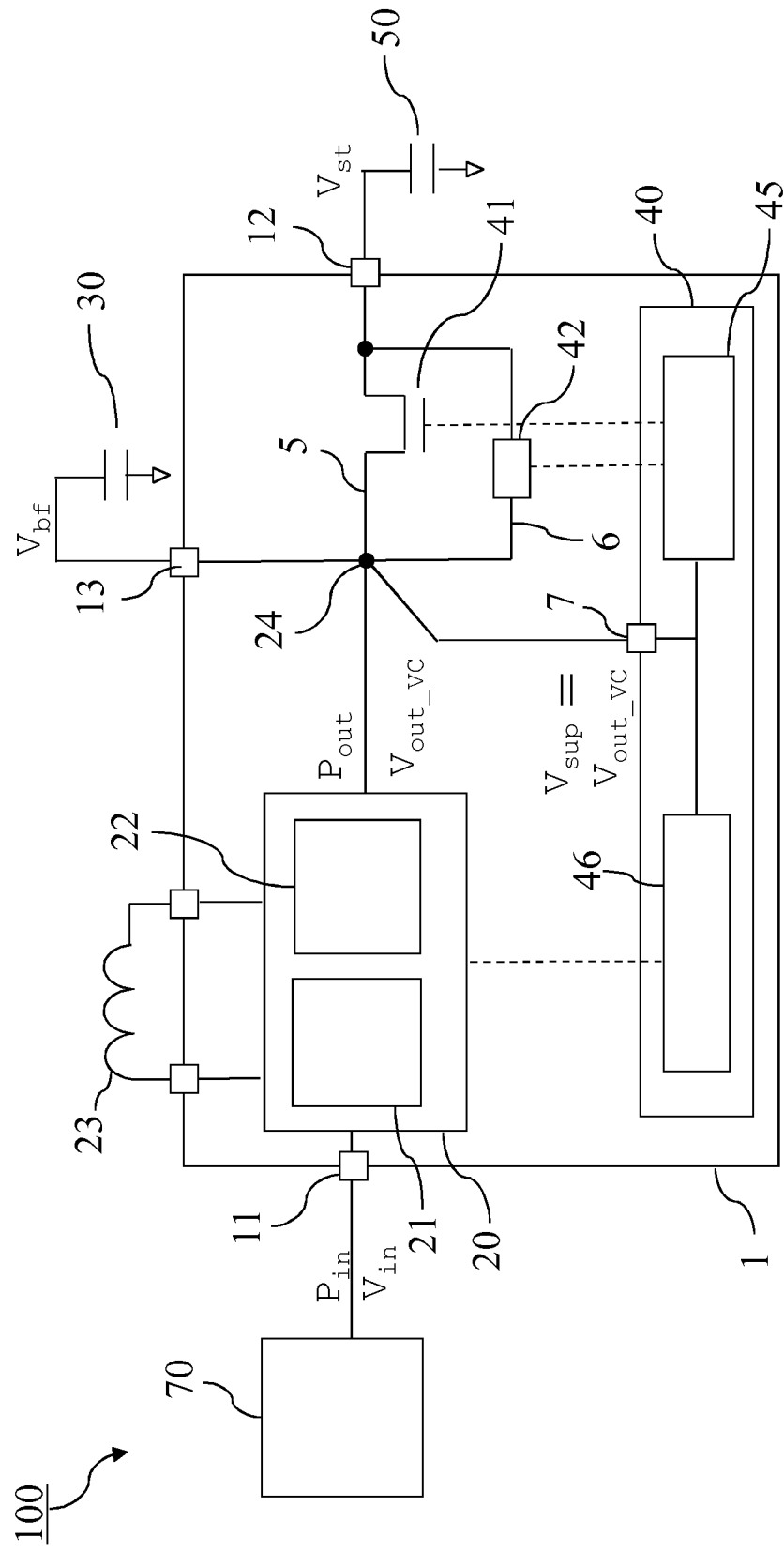

FIG. 3 schematically illustrates part of an energy harvesting system according to the invention, FIG. 4 schematically shows a further example of an energy harvesting system according to the invention, FIG. 5 shows a further example of a system for energy harvesting according to the invention.

DETAILED DESCRIPTION OF PREFERRED EMBODIMENTS

According to a first aspect of the invention a method for charging a storage device 50 with energy from an energy harvester 70 using a voltage converter 20 is provided. The method according to the invention allows for charging a storage device that is depleted. The storage device can be a capacitor, a supercapacitor or a conventional rechargeable battery such as for example a Li-ion battery. A system using the method according to the invention is schematically illustrated on FIG. 1.

The voltage converter 20 used for charging the storage device is configured for receiving an input power $P_{in}$ from the energy harvester 70, for example at an input voltage $V_{in}$, and configured for converting the input power into an output power $P_{out}$ at an output voltage $V_{out\_VC}$. The method according to the invention is applicable for a voltage converter 20 that comprises a main voltage converter 22 operable when the output voltage $V_{out\_VC}$ at an output of the voltage converter is equal or larger than a first voltage value V1 and a coldstart voltage convertor 21 operable when the output voltage $V_{out\_VC}$ is lower than the voltage value V1.

The method according the invention comprises steps of coupling a buffer capacitor 30 with an output of the voltage converter 20 and charging the buffer capacitor with energy from the energy harvester using the coldstart voltage converter 21. As the buffer capacitor is conductively coupled with the output of the voltage converter, a voltage $V_{bf}$ at the buffer capacitor corresponds to the output voltage $V_{out\_VC}$ of the voltage converter.

The buffer capacitor has a capacitance value in the microfarad range, for example a capacitance value between 5 and 25 microfarad. When a capacitor or supercapacitor is used as storage device, the capacitance of the buffer capacitor is much lower than the capacitance of the storage device such that that the time to charge the buffer capacitor to a given voltage is much shorter than charging the storage device to that same voltage. In this way, the time to charge the buffer capacitor with the cold-start converter up to the operating voltage value V1 of the main voltage converter is reduced.

According to the method of invention, if a voltage $V_{bf}$ of the buffer capacitor 30 has reached the first voltage value V1, then the coldstart voltage converter 21 is disabled and the main voltage converter 22 is enabled. As known in the art, the voltage converters are configured for using their output voltage $V_{out\_VC}$ that is equal to the voltage $V_{bf}$ of the buffer capacitor as a supply voltage for operating the main voltage converter. The time period T1 to charge the buffer capacitor from for example 0V to the first voltage value V1 is schematically illustrated in FIG. 2 showing the increase of the voltage $V_{bf}$ of the buffer capacitor as function of a time T.

Further, a parameter $M_{sto}$ is monitored, wherein the parameter $M_{sto}$ is indicative of a voltage $V_{sto}$ of the storage device 50. The word "indicative" has here to be construed in the sense that the parameter $M_{sto}$ provides an information indicating what voltage $V_{sto}$ is present at the storage device. In embodiments, as will be further discussed below in more detail, the parameter $M_{sto}$ is not necessary a voltage parameter.

As long as the monitored parameter $M_{sto}$ is lower than a reference value $M_{sto-min}$, the following steps are repetitively performed:

a) charging the buffer capacitor with energy from the energy harvester using the main voltage converter 22, and if the voltage of the buffer capacitor $V_{bf}$ becomes equal or larger than a second voltage value V2>V1, then transferring charges from the buffer capacitor 30 to the storage device 50, and b) stopping transferring charges from the buffer capacitor to the storage device when the voltage of the buffer capacitor $V_{bf}$ is below a third voltage value V3, with V1<V3<V2.

The repetition of these steps a) and b), performed in a time period T2, is illustrated in FIG. 2. As schematically illustrated on FIG. 2, the charging time $T_c$ for repetitively charging the buffer capacitor from the voltage V3 to the voltage V2 remains the same, assuming a constant power supply from the energy harvester. However, as also schematically illustrated on FIG. 2, the de-charging time $T_{DC}$ for de-charging the buffer capacitor from the second voltage value V2 to the third voltage value V3 is generally increasing as a consequence of the voltage $V_{st}$ of the storage device being increasing after each charging and de-charging cycle of the buffer capacitor. On FIG. 2, the voltage of the storage device $V_{st}$ is also shown, illustrating the step-wise increase of the storage voltage $V_{st}$ during the time period T2.

In embodiments, the voltage value V3 is typically comprised in the range V1+0.1V<V3<V2−0.1V.

If the monitored parameter $M_{sto}$ is equal or larger than the reference value $M_{sto-min}$, then the output of the voltage converter is conductively connected with the storage device. Thereafter, as illustrated on FIG. 2, during a time period T3, the storage device 50 continues charging with energy from the energy harvester using the main voltage converter 22.

The reference value $M_{sto-min}$ is indicative of a storage reference voltage value $V_{st-ref}$ of the storage device and the reference voltage value is comprised in a range V1<$V_{st-ref}$<V3.

The number of cycles for charging and de-charging the buffer capacitor during the time period T2, i.e. the number of times steps a) and b) that need to be repeated depends on the ratio between the value of the capacitance of the storage device and the capacitance of the buffer capacitor. If the buffer capacitor has a capacitance in the microfarad range, hundreds to thousands of charging and de-charging cycles are needed to be performed when using a supercapacitor as a storage device, depending of the specific value of the capacitance of the supercapacitor.

In preferred embodiments, the monitored parameter $M_{sto}$ corresponds to a time $T_{DC}$ for de-charging the buffer capacitor from the second voltage V2 to the third voltage V3. As discussed above, the de-charging time $T_{DC}$ of the buffer capacitor is increasing when the storage voltage $V_{st}$ of the storage device is increasing, hence the de-charging time $T_{DC}$ is an example of a parameter indicative of the voltage $V_{st}$ of the storage device. The de-charging time $T_{DC}$ is monitored during the step of transferring charges from the buffer capacitor to the storage device. When $T_{DC}$ becomes larger than a de-charging time reference value $T_{DC-REF}$, i.e. when the storage device is considered sufficiently charged and hence has obtained the storage reference voltage value $V_{st-ref}$, the storage device is conductively coupled with the output of the voltage converter.

In alternative embodiments, the monitored parameter $M_{sto}$ the voltage $V_{st}$ of the storage device 50 and the reference value $M_{sto-min}$ is the reference voltage value $V_{st-ref}$.

In further embodiments, the monitored parameter $M_{sto}$ corresponds to $1/(dV_{bf}/dt)$ or is proportional to $(dV_{bf}/dt)$, with $dV_{bf}/dt$ defining a variation of the voltage $V_{bf}$ over time during the de-charging of the buffer capacitor when transferring charges from the buffer capacitor to the storage device. In practice, such a monitoring parameter based on the ratio $(dV_{bf}/dt)$ can for example be monitored by checking that the buffer capacitor 30 has not been discharged to V3 before a timer, started at the moment when the transfer of charges from the buffer capacitor to the storage device was initiated, has reached a predefined time reference value.

Generally, to avoid overcharging of the storage device during time period T3, there is an upper maximum voltage value defined for charging the storage device.

In some embodiments, during the transfer of charges from the buffer capacitor 30 to the storage device 50, the main voltage converter 22 is disabled, while in other embodiments the main voltage converter 22 remains enabled during the charge transfer from the buffer capacitor to the storage device. Generally, if the monitored parameter $M_{sto}$ is based on a timing measurement, then for remaining the main voltage converter 22 enabled during the de-charging period of the buffer capacitor, the harvested current via the main voltage converter has to be much lower than the current corresponding to the charge transfer from the buffer capacitor to the storage device. In embodiments where the main voltage converter remains enabled during the de-charging period of the buffer capacitor, the voltage $V_{sto}$ is generally used as the monitored parameter $M_{sto}$. In these embodiments, the output of the voltage converter is conductively connected with the storage device as soon as $V_{sto}$ is equal or larger than the storage reference voltage value $V_{st-ref}$.

Preferably, when transferring charges from the buffer capacitor to the storage device, the associated current flow between the buffer capacitor and the storage device is limited to a maximum current value. Limiting this current flow to a maximum current value allows to better monitor the voltage of the buffer capacitor and take the necessary actions if the voltage value V3 is reached.

In preferred embodiments, the storage device is a capacitor or a supercapacitor. Advantageously, the method according to the invention can also be applied when the storage device is a regular rechargeable battery. When the rechargeable battery is depleted, there is generally a remaining minimum voltage, typically a voltage between V1 and V2. In this case, the process steps a) and b) discussed above only need to be performed a limited number of times depending on the remaining minimum depletion voltage.

Generally, as known in the art, the coldstart voltage converter starts automatically with energy harvesting when the input voltage $V_{in}$ has at least a minimum voltage value V0. In embodiments, the voltage value V0 needed to start the coldstart voltage converter 21 is typically between 0.1 V and 1 V.

According to a second aspect of the invention, a power management integrated circuit (PMIC) 1 for transferring an energy from an energy harvesting source to a storage capacitor is provided. A system for energy harvesting 100 comprising a PMIC 1 is schematically illustrated on FIG. 1.

The PMIC according to the invention has to be construed as a microchip comprising integrated circuits and a number of input and output pins, also named terminals. For example, a PMIC can have between 16 and 32 terminals. Generally, the PMIC's have a compact packaging resulting in a square or rectangular footprint with sides having a length between 3 and 5 mm. A terminal is named input/output terminal if, when the PMIC is operable, the current at this terminal can flow in two directions. For example, if a battery is connected to an input/output terminal of the PMIC, current can either flow from the PMIC towards the battery or current can flow from the battery towards the PMIC.

The PMIC comprises a voltage converter 20, an input terminal 11 for receiving an input power $P_{in}$ from the energy harvester 70 at an input voltage $V_{in}$, a first input/output terminal 12 connectable with a storage device 50 and a second input/output terminal 13 connectable with a buffer capacitor 30.

As discussed above, the voltage converter is configured for converting the input power $P_{in}$ into an output power $P_{out}$ at an output voltage $V_{out\_VC}$. The voltage converter 20 comprises a main voltage converter 22 operable when the output voltage $V_{out\_VC}$ at an output node 24 of the voltage converter, is equal or larger than a first voltage value V1. The voltage of the output node 24 corresponds to the output voltage at the output of the voltage converter.

The main voltage converter 22 corresponds to for example a DC-DC boost converter circuit for increasing the input voltage $V_{in}$, or a buck converter circuit for decreasing the input voltage, or a buck-boost converter circuit for both decreasing or increasing the input voltage. These type of main voltage converters are known in the art.

The cold start voltage converter 21, known in the art, is operable when the output voltage $V_{out\_VC}$ is lower than the voltage value V1, i.e. when the main voltage converter is not operable. Typically, when $V_{out\_VC}$<V1, the cold start voltage converter will automatically start energy harvesting when the input voltage $V_{in}$ is higher than a minimum input voltage V0. For example, the PMIC with reference AEM10940 comprises a cold-start voltage converter that starts to operate at an input voltage $V_{in}$ as low as 380 mV and with an input power of 11 microwatt. The cold start voltage converter typically comprises a charge pump. The cold start voltage converter will operate until the converter output voltage $V_{out\_VC}$ has reached the first voltage value V1. Typically, the first voltage value V1 that is needed as a supply voltage to enable operation of the main voltage converter 22 is between 1.5 V and 2.5 V.

As schematically illustrated on FIG. 1, the PMIC according to the invention comprises a first conductive path 5 conductively coupling an output node 24 of the voltage converter 20 with the first input/output terminal 12. The first path 5 comprises a switching device 41 configured for opening or closing the first path 5.

As illustrated on FIG. 1, the output node 24 of the voltage converter 20 is also conductively connected with the second input/output terminal 13. In this way, when the voltage converter is in operation, a buffer capacitor 30 that is connected to the second input/output terminal 13 is charged by the power provided through the voltage converter.

As further illustrated on FIG. 1, the PMIC 1 according to the invention is characterized in that the PMIC comprises a second conductive path 6 conductively coupling the output node 24 of the voltage converter with the first input/output terminal 12. The second path 6 comprises a current control device 42 configured for opening or closing the second conductive path 6 and configured for limiting a current flow through the second conductive path 6 when the second conductive path 6 is closed. The current control device 42 is controlled by the controller 40 of the PMIC.

The switching device 41 of the first conductive path 5 has to be construed as a device suitable for opening and closing the first conductive path 5, i.e. prohibiting or allowing a current flow in the first conductive path 5. Generally, the switching device 41 is configured for minimizing an impedance between a buffer capacitor 30 connected to the second output terminal and a storage device 50 connected to the first output terminal.

In embodiments, the switching device 41 comprises a main switch. The main switch is for example an analogue electronic switch known in the art. Typically, such a switch makes use of a PMOS transistor.

When the first conducting path 5 is closed by the switching device, power from the output of the voltage converter is directly transferred to the storage device. The switching device adds a resistance to the first conductive path and the resistance R1 of the switching device results in power losses during the transfer of power from the voltage converter to the storage device. Therefore, the resistance R1 of the switching device needs to be as small as possible. Typically, the resistance R1 is in the range between 0.1 and 1 ohm, and typical currents flowing during nominal operation of the PMIC through the first conductive path 5 are ranging between 10 microampere and 100 milliamperes. To limit the power losses in the PMIC, and hence limiting the resistance R1, the size of the switching device in terms of silicon area is large. A typical size of the switching device is terms of silicon area is in a range between 0.05 and 0.02 mm². Therefore, PMIC topologies need to be designed to limit the number of switches in the power path for transferring power from the energy harvester to the storage device and/or from the storage device to a variable loads connected to the PMIC.

The current control device 42 of the second conductive path 6 has to be construed as a device that is on one hand suitable for opening and closing the second conductive path 6, i.e. prohibiting or allowing a current flow in the second conductive path and on the other hand is suitable to limit a current flow in the second conductive path when it is closed. The current control device 42 plays a role during the pre-charging phase of the charging process where, as discussed above, the storage device is pre-charged up to a reference voltage $V_{st\text{-}ref}$>V1.

Preferably, the current in the second conductive paths 6 is limited to a maximum current value ranging between 100 μA (microampere) and 10 mA (milliampere). To what maximum current value the current control device is limiting the current in the second conducting path can vary from PMIC embodiment to PMIC embodiment. The maximum current value to be selected is related to a number of parameters such as the capacitance of the buffer capacitor to be used, the voltage value V2 and the clock frequency of the controller 40 of the PMIC. Indeed, when in operation, as the current flow in the second conductive path is limited, the current control device imposes a minimum de-charging time $T_{DC}$ for de-charging the buffer capacitor from the voltage V2 to the voltage V3. If the clock frequency of the controller is for example 25 kHz, the de-charging time must at least be larger than 40 microseconds to allow the controller to control the charging process of the storage device as will be further discussed below.

In embodiments according to the invention, the current control device 42 comprises a current-limiting switch. The current-limiting switch is for example an analogue electronic switch known in the art making use of a single PMOS transistor whose size and conductance limit the current. Such a single PMOS transistor is used in an open and close mode. In this mode, when the current-limiting switch is closing the second conductive path, the current in the second conductive path is always limited to a same maximum value, for example to a maximum value of 10 mA.

In alternative embodiments, the current-limiting switch is implemented for operating in a dynamic mode where, i.e. when the current-limiting switch is closing the second conductive path, the current limitation is dynamically adjusted taking into account the voltage $V_{st}$ of the storage device or taking into account the de-charging time $T_{DC}$ for de-charging the buffer capacitor. In this way, by dynamically adjusting the maximum current in the second conductive path, a same de-charging time $T_{DC}$ can for example be maintained for the subsequent de-charging time periods of the buffer capacitor. When using a single PMOS transistor as a current-limiting switch, the current limitation can be dynamically modified by varying the gate signal of the transistor thereby modulating the impedance of the transistor.

Alternatively, the current control device 42 comprises multiple current-limiting switches that are dynamically activated depending on the voltage of the storage device or depending on de-charging time $T_{DC}$ for de-charging the buffer capacitor. For example if the voltage $V_{st}$ of the storage device is low, only few current-limiting switches are activated, while if $V_{st}$ becomes higher, the number of activated current-limiting switches can be increased in order to maintain a same de-charging time $T_{DC}$.

In alternative embodiments, the current control device 42 comprises a current-limiting voltage converter configured as device to limit a current flow in the second conductive path 6. The advantage of using a voltage converter as a current-limiting device when compared to a single PMOS transistor is that the power losses during the transfer of charges from the buffer capacitor to the storage device are reduced. In this way, less charging and de-charging cycles of the buffer capacitor are needed to charge the storage device up to the reference voltage $V_{st\text{-}ref}$. In other words, the time period T2 indicated on FIG. 2 is reduced when using a current-limiting voltage converter instead of an electronic switch. An example of a voltage converter that can be used for the current control device 42 is a switching converter using capacitors as reactive components, known in the art. These convertors are also named capacitor networks or switched capacitor networks.

The current control device 42 adds a resistance R2 to the second conductive path. This resistance R2 of the current control device is much larger when compared to the resistance R1 of the switching device. Hence, the surface of the current control device in terms of silicon area is much smaller than the surface area of the switching device.

Preferably, the silicon surface area of the current control device 42 is at least five times smaller than the silicon surface area of the switching device 41. More preferably, the silicon surface area of the current control device 42 is at least ten times smaller than the silicon surface area of the switching device 41. In an embodiment, the silicon surface area of the current control device is forty times smaller than the surface area of the switching device.

The controller 40 comprises a means for monitoring the output voltage $V_{out\_VC}$ at the output node 24 of the voltage converter. As the output node 24 is coupled with the second input/output terminal, the voltage $V_{bf}$ at a buffer capacitor when coupled to the second input/output terminal, corresponds to the output voltage $V_{out\_VC}$.

The controller 40 further comprises a means for monitoring a parameter $M_{sto}$ indicative of a voltage $V_{st}$ at first input/output terminal 12.

The controller 40 of the PMIC is configured for, when in operation, performing a number of steps for executing a charging process of a storage device when coupled to the first input/output terminal 12 and when a buffer capacitor is coupled to the second input/output terminal 13. There are three charging phases that can be distinguished in the charging process as illustrated on FIG. 2.

In a first phase, if $V_{out\_VC}$<V1, the coldstart voltage convertor 21 is enabled. As in this first phase the available voltage is low, the switching device 41 and the current control device 42 cannot be powered and hence, by default, the first path 5 and the second path 6 are open. During this first phase, as illustrated on FIG. 2 and indicated with the time period T1, a buffer capacitor coupled to the second input/output terminal is charged and its voltage $V_{bf}=V_{out\_VC}$ is increasing.

In a second phase, if $V_{out\_VC} \geq V1$, the controller is operable and disables the coldstart voltage converter 21 and enables the main voltage converter 22. As long as the monitored parameter $M_{sto}$ is lower than a reference value $M_{sto\text{-}min}$, the controller is maintaining the first conductive path 5 open and is performing repetitively the following steps of a) controlling a charge transfer from the input terminal 11 to the second input/output terminal 13 by monitoring an increase of the voltage $V_{bf}=V_{out\_VC}$ and closing the second path 6 if $V_{bf}$ reaches a second voltage value V2 with, with V2>V1, b) controlling a charge transfer from the second input/output terminal 13 to the first input/output terminal 12 by monitoring a decrease of the voltage $V_{bf}=V_{out\_VC}$ and opening the second path 6 if $V_{bf}$ reaches a third voltage value V3, with V1<V3<V2.

The configuration of the PMIC during this second charging phase T2 is schematically shown on FIG. 3. During this second charging phase T2, the first conducting path 5 remains opened by the switching device 41 and the second conductive path 6 couples the buffer capacitor 30 with the storage device 50 for transferring charges from the buffer capacitor to the storage device under control of the current control device 42.

Finally, in a third phase according the invention, if the monitored parameter $M_{sto}$ is equal or larger than the minimum value $M_{sto\text{-}min}$ then the controller closes the first conducting path 5. Hence, when the first conducting path is closed, power is directly transmitted from the output of the voltage converter to the storage device via this first conducting path that is not limited by a current limitation. During the third phase, depending on the detailed embodiment, the second path can either remain closed or it can be opened.

In embodiments, the means for monitoring the voltage $V_{out\_VC}$, comprises a voltage comparator for comparing an actual voltage with the voltage values V1, V2 and V3. The use of voltage comparators in electronic circuits is well known in the art. For example, the PMIC can comprise an internal reference voltage and a voltage comparison is established by comparing voltage fractions with the reference voltage.

In embodiments, the means for monitoring a parameter $M_{sto}$ is a voltage detector known in the art. In this embodiment, the voltage detector also comprises a comparator for comparing the monitored voltage of the storage device with the storage reference value $V_{st\_ref}$.

In preferred embodiments, the means for monitoring a parameter $M_{sto}$ comprises a timer for measuring the time $T_{DC}$ for de-charging the buffer capacitor from a voltage V2 to a voltage V3. As discussed above, measuring this de-charging time and comparing it with a time reference value $T_{DC\text{-}REF}$, results in a closing of the first conducting path with the switching device if the voltage $V_{out\_VC}$ has not fallen below V3 within the time reference value $T_{DC\text{-}REF}$.

As known in the art, the controller and/or the main voltage converter of a PMIC require a voltage supply for operating for example the electronic switches of the PMIC. In embodiments of the PMIC according to the invention, as schematically illustrated on FIG. 4, a supply input 7 of the controller 40 is coupled with the output node 24 of the voltage converter for receiving the voltage $V_{out\_VC}$ as a voltage supply. In this way, the voltage available at a supply input 7 of the controller 40, during each of the charging phases, is always equal to $V_{out\_VC}$. The controller uses this voltage supply for controlling for example the voltage converter and the switches in the PMIC circuits such as the switch of the switching device 41 or the switch of the current control device 42. In further embodiments, a DC-DC converter may be added between the output node 24 and supply input 7 to reduce the voltage supply for the controller. In the current document, this DC-DC converter is further named supply DC-DC converter and the supply DC-DC converter is configured for reducing the voltage $V_{out\_VC}$ to a reduced voltage and for providing the reduced voltage as the voltage supply for the controller 40.

In embodiments, the controller 40 comprises various sub-controllers as schematically illustrated on FIG. 5 where the controller 40 comprises for example a main voltage controller 45 and a voltage-converter controller 46. The voltage-converter controller 46 is dedicated for controlling switches of the voltage converter, while the main voltage controller 45 controls, in this example, the switching device 41 and the current control device 42.

As known in the art, the voltage converter makes use of an inductor, which is either part of the PMIC or alternatively the inductor can be placed outside the PMIC and coupled to the PMIC through one or more terminals, as schematically illustrated on FIG. 4. Typically, when the main voltage converter is a DC-DC boost converter, the inductor 23 is placed between the energy harvester and the input of the voltage converter.

In embodiments according to the invention, as also illustrated on FIG. 4, the PMIC comprises a load output terminal 14 for supplying power to an external load 60. The load output terminal 14 is coupled with the output of the voltage converter 20 through an auxiliary voltage converter 25. The auxiliary voltage converter 25 allows to provide an output power for the external load 60 at a required output voltage $V_{out\_req}$. This auxiliary voltage converter 25 can be a boost voltage converter, a buck voltage converter or a linear drop out regulator (LDO) known in the art.

As discussed above, during the charging process for charging the storage device, when the parameter $M_{sto}$ has reached the reference value $M_{sto-min}$, the controller 40 closes the first conducting path 5 for continuing charging the storage device through the first conducting path. In embodiments, when the voltage $V_{sto}$ of storage device reaches a further voltage value $V\_EN > V_{st\_ref}$, the controller 40 enables the load voltage converter 25 for supplying an output power at the load output terminal 14. In this way, power can be supplied to an external load 60.

In alternative embodiments, a variable load can additionally be coupled to the first and/or second input/output terminal.

The invention is also related to a system for energy harvesting 100 as schematically illustrated on FIG. 1. Such a system for energy harvesting comprises a power management integrated circuit 1 as discussed above and defined in the appended claims, an energy harvester 70 coupled to a power input terminal 11 of the PMIC 1 for providing the input power $P_{in}$, a storage device 50 connected to the first input/output terminal 12 and a buffer capacitor 30 connected to the second input/output terminal 13.

In embodiments, illustrated on FIG. 4, the system for energy harvesting 100, further comprises an external load 60 coupled to a load output terminal 14. In these systems for energy harvesting, an auxiliary voltage converter 25 is coupled between the output node 24 of the voltage converter 20 and the load output terminal 14. As discussed above, this auxiliary voltage converter 25 is configured for providing an output power at a required output voltage $V_{out\_req}$.

The present invention has been described in terms of specific embodiments, which are illustrative of the invention and not to be construed as limiting. It will be appreciated by persons skilled in the art that the present invention is not limited by what has been particularly shown and/or described above and that alternatives or modified embodiments could be developed in the light of the overall teaching of this disclosure. Use of the verb "to comprise", as well as the respective conjugations, does not exclude the presence of elements other than those stated. Use of the article "a", "an" or "the" preceding an element does not exclude the presence of a plurality of such elements.

The invention claimed is:

1. A power management integrated circuit (1) for charging a storage device with energy from an energy harvester comprising
   an input terminal (11) for receiving an input power (Pin) from the energy harvester,
   a voltage converter (20) for converting said input power (Pin) into an output power (Pout) and wherein said voltage converter (20) comprises
      i) a main voltage converter (22) operable if an output voltage Vout_VC at an output node (24) of the voltage converter (20) is equal or larger than a first voltage value V1, and
      ii) a coldstart voltage convertor (21) operable if said output voltage Vout_VC is lower than said first voltage value V1,
   a first input/output terminal (12) connectable with a storage device (50),
   a first conductive path (5) conductively coupling said output node (24) of the voltage converter (20) with said first input/output terminal (12), and wherein said first conductive path (5) comprises a switching device (41) configured for opening and closing said first conductive path (5), and
   a second input/output terminal (13) connectable with a buffer capacitor (30), and wherein said second input/output terminal (13) is conductively coupled with said output node (24) of the voltage converter (20) such that a voltage Vbf of the buffer capacitor when being connected to said second input/output terminal (13) corresponds to said output voltage Vout_VC, characterized in that said coldstart voltage converter (21) when operable is configured for transferring charges from said input terminal (11) to said second input/output terminal (13) until the voltage Vout_VC has reached said voltage value V1, and in that said power management integrated circuit (1) comprises
   a second conductive path (6) conductively coupling said output node (24) of the voltage converter (20) with said first input/output terminal (12), and wherein said second conductive path (6) comprises a current control device (42) configured for opening and closing said second conductive path (6) and configured for limiting a current flow in said second conductive path (6) to a maximum value when said second conductive path (6) is closed, and
   a controller (40) configured for
      i) disabling operation of the coldstart voltage converter (21) and enabling operation of the main voltage converter (22) if said output voltage Vout_VC has reached said voltage value V1,
      ii) controlling said current control device (42),
      iii) monitoring said voltage Vout_VC at said output node (24) of the voltage converter (20),
      iv) monitoring a parameter Msto indicative of a voltage Vst at the first input/output terminal (12),
      v) if Msto is lower than a reference value Msto-min then maintaining the first conductive path (5) open and repetitively performing steps of
         a) controlling a charge transfer from said input terminal (11) to said second input/output terminal (13) by monitoring an increase of the voltage Vout_VC and if Vout_VC reaches a second voltage value V2, with V2>V1, then closing the second conductive path (6), and b) controlling a charge transfer from said second input/output terminal (13) to said first input/output terminal (12) by monitoring a decrease of the voltage Vout_VC and if Vout_VC reaches a third voltage value V3, with V1<V3<V2, then opening the second conductive path (6), vi) closing the first conductive path (5) if Msto is equal or larger than said reference value Msto-min, and wherein said reference value Msto-min is indicative of a reference voltage value Vst-ref of said storage device, with V1<Vst-ref<V3.

2. The power management integrated circuit (1) according to claim 1 wherein said current flow in said second conductive path (6) is limited by said current control device (42) to a maximum current flow value ranging between 100 µA and 10 mA.

3. The power management integrated circuit (1) according to claim 1 wherein said current control device (42) comprises a current-limiting switch or a current-limiting voltage converter.

4. The power management integrated circuit (1) according to claim 1 wherein said controller (40) comprises a supply input (7) for receiving a voltage supply for operating said controller (40), and wherein said supply input (7) is coupled with said output node (24) for receiving said voltage Vout_VC as said voltage supply for said controller (40) or wherein said supply input (7) is coupled with said output node (24) through a supply DC-DC converter configured for reducing said voltage Vout_VC to a reduced voltage and for providing the reduced voltage as said voltage supply for said controller (40).

5. The power management integrated circuit (1) according to claim 1 wherein a silicon surface area of the current control device (42) is at least five times smaller than a silicon surface area of the switching device (41) or wherein a resistance R2 of said current control device (42) is at least five times larger than a resistance R1 of said switching device (41).

6. The power management integrated circuit (1) according to claim 1 wherein 1.5 V<V1<2.5 V, 2.5 V<V2<5.0 V and V1+0.1V<V3<V2−0.1V.

7. The power management integrated circuit (1) according to claim 1 comprising a load output terminal (14) for connecting an external load (60), an auxiliary voltage converter (25) coupled between said output node (24) of the voltage converter (20) and said load output terminal (14), and wherein said auxiliary voltage converter (25) is configured for providing an output power at a required output voltage Vout_req.

8. A system (100) for energy harvesting comprising a power management integrated circuit (1) according to claim 7, an energy harvester (70) coupled to said input terminal (11) of said power management integrated circuit (1) for providing said input power (Pin), a storage device (50) connected to said first input/output terminal (12), a buffer capacitor (30) connected to said second input/output terminal (13), an external load (60) coupled to said load output terminal (14).

9. A system (100) for energy harvesting comprising a power management integrated circuit (1) according to claim 1, an energy harvester (70) coupled to said input terminal (11) of said power management integrated circuit (1) for providing said input power (Pin), a storage device (50) connected to said first input/output terminal (12), and a buffer capacitor (30) connected to said second input/output terminal (13).

* * * * *